(12) United States Patent
Shen et al.

(10) Patent No.: US 7,866,825 B2
(45) Date of Patent: Jan. 11, 2011

(54) BLIND FOR A PROJECTOR

(75) Inventors: Hui Shen, Shenzhen (CN); Gen-Ping Deng, Shenzhen (CN); Yi-Qiang Wu, Shenzhen (CN)

(73) Assignees: Fu Zhun Precision Industry (Shen Zhen) Co., Ltd., Shenzhen, Guangdong Province (CN); Foxconn Technology Co., Ltd., Tucheng, Taipei County (TW)

( * ) Notice: Subject to any disclaimer, the term of this patent is extended or adjusted under 35 U.S.C. 154(b) by 530 days.

(21) Appl. No.: 11/937,406

(22) Filed: Nov. 8, 2007

(65) Prior Publication Data

US 2009/0122268 A1    May 14, 2009

(51) Int. Cl.
*G03B 21/16* (2006.01)

(52) U.S. Cl. .............. 353/52; 353/55; 353/56; 353/57; 353/58; 353/60; 353/61; 353/62; 353/119; 353/122; 361/679.48; 361/679.49; 361/695; 361/703; 361/704; 361/700; 174/15.2; 174/16.3; 454/184; 257/712

(58) Field of Classification Search .............. 353/52, 353/55, 56, 58, 60, 61, 62, 66, 67, 119, 122; 165/58, 59, 66, 80.3, 80.4; 454/184; 361/679.48, 361/679.49, 695, 703, 704, 700; 174/15.2, 174/16.3
See application file for complete search history.

(56) References Cited

U.S. PATENT DOCUMENTS

| | | | | |
|---|---|---|---|---|
| 5,737,187 A * | 4/1998 | Nguyen et al. | ............... | 361/704 |
| 5,842,761 A * | 12/1998 | Futakami et al. | ............ | 353/119 |
| 6,824,272 B2 * | 11/2004 | Hsu et al. | ...................... | 353/61 |
| 6,834,964 B2 * | 12/2004 | Nishihara et al. | ............. | 353/52 |
| 7,086,740 B2 * | 8/2006 | Sample et al. | ................ | 353/52 |
| 7,140,734 B2 * | 11/2006 | Lim | ........................... | 353/61 |
| 7,559,657 B2 * | 7/2009 | Arboix | ....................... | 353/61 |
| 2006/0290894 A1 * | 12/2006 | Asada | ........................ | 353/58 |
| 2007/0146644 A1 * | 6/2007 | Ma et al. | ...................... | 353/52 |
| 2009/0059525 A1 * | 3/2009 | Peng et al. | .................. | 361/697 |
| 2009/0122268 A1 * | 5/2009 | Shen et al. | .................... | 353/52 |

FOREIGN PATENT DOCUMENTS

| CN | 1661465 A | 8/2005 |
|---|---|---|
| CN | 1220113 C | 9/2005 |

* cited by examiner

*Primary Examiner*—Georgia Y Epps
*Assistant Examiner*—Sultan Chowdhury
(74) *Attorney, Agent, or Firm*—Jeffrey T. Knapp

(57) ABSTRACT

A blind (10) for a projector includes a bracket (20) mounted to the projector, and a folded fin (30) fixed on the bracket and covering a hot air vent of the projector. The folded fin includes a plurality of parallel fins (32) and a plurality of upper and lower tabs (34, 36) interconnecting the fins. Each of the fins defines an angle of 135 degrees with a plane defined by the lower tabs. Furthermore, a projection of each of the fins on the plane defined by the lower tabs overlaps a part of a corresponding adjacent fin. Thus, the blind can prevent a light leakage from the projector, while allow a heated airflow to be expelled out of the projector simultaneously.

14 Claims, 4 Drawing Sheets

BLIND FOR A PROJECTOR

BACKGROUND OF THE INVENTION

1. Field of the Invention

The present invention relates to a blind, and more particularly to a blind which can prevent a light leakage and dissipate heat simultaneously for a projector.

2. Description of Related Art

In recent years, projectors are used more and more popularly for projecting images in many occasions.

Conventionally, a projector comprises a light source unit for emitting light, a light source optical system for transmitting the light, a display device for producing an image by receiving the light, a projection optical system for projecting the image to a screen, a blower for cooling the light source unit, and a case for receiving all of the above components therein. The case defines a vent at a side thereof for expelling heated air that has passed through the light source unit to an outside of the projector by the blower.

However, since the vent communicates an interior with an exterior of the projector without any shading structure, the light emitted by the light source unit will directly leak from the interior to the exterior of the projector via the vent, thereby interfering the image and influencing a quality of the image that the projector projects.

In order to prevent the leakage of the light, a cover is used to cover the vent for blocking the light. Nevertheless, blocking of the light by the cover simultaneously blocks the heated air from flowing out of the projector through the vent; and this may cause the projector to overheat or even malfunction.

What is needed, therefore, is a blind which can overcome the above-mentioned disadvantages.

SUMMARY OF THE INVENTION

A blind for a projector includes a bracket mounted to a vent of the projector, and a folded fin fixed on the bracket and covering the vent. The folded fin includes a plurality of parallel fins and a plurality of tabs interconnecting the fins. The tabs further include upper tabs interconnecting upper portions of the fins, and lower tabs interconnecting lower portions of the fins. The lower tabs alternate with the upper tabs. Each of the fins defines an angle of 135° with a plane defined by the lower tabs. The blind can prevent a light leakage from the projector and allow a heated airflow to be expelled out of the projector.

Other advantages and novel features of the present invention will become more apparent from the following detailed description when taken in conjunction with the accompanying drawings, in which:

BRIEF DESCRIPTION OF THE DRAWINGS

Many aspects of the present apparatus can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION OF THE INVENTION

Figure 1:
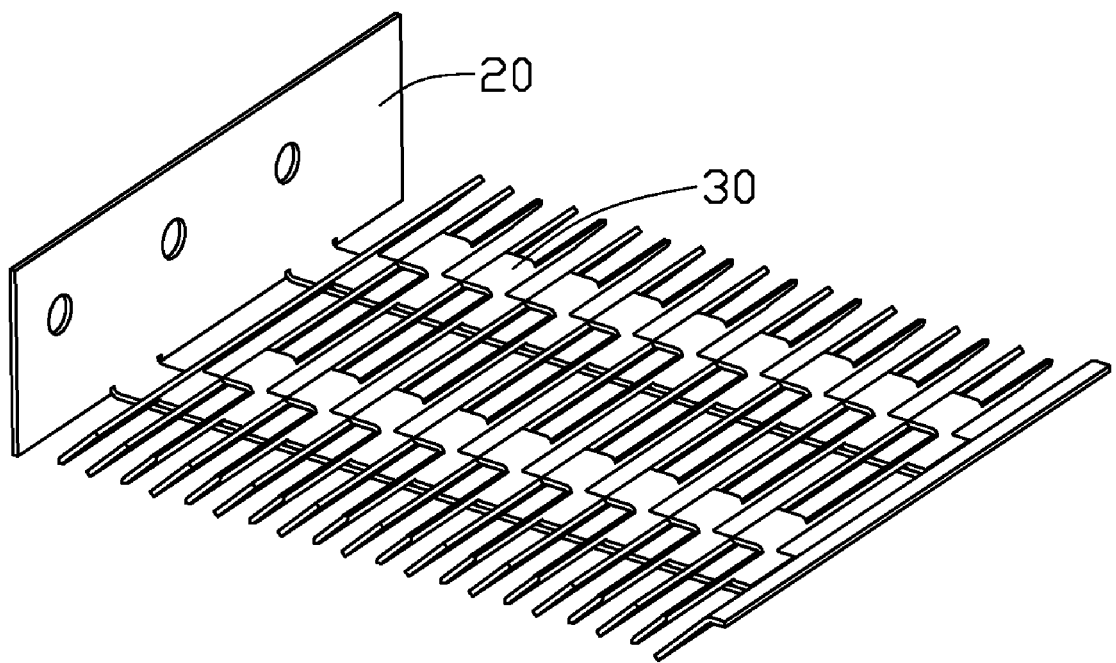
FIG. 1 is an assembled, isometric view of a blind in accordance with a preferred embodiment of the present invention with the blind placed in a horizontal orientation.

Referring to FIG. 1, a blind 10 of a preferred embodiment of the present invention is used for a projector (not shown) to hood light and simultaneously enable a heated airflow to flow out of the projector via the blind 10. The blind 10 comprises a bracket 20 and a fin arrangement 30 fixed to the bracket 20. The projector defines a vent (not shown) at a side thereof. The blind 10 is mounted in the vent so as to cover the vent.

Figure 2:
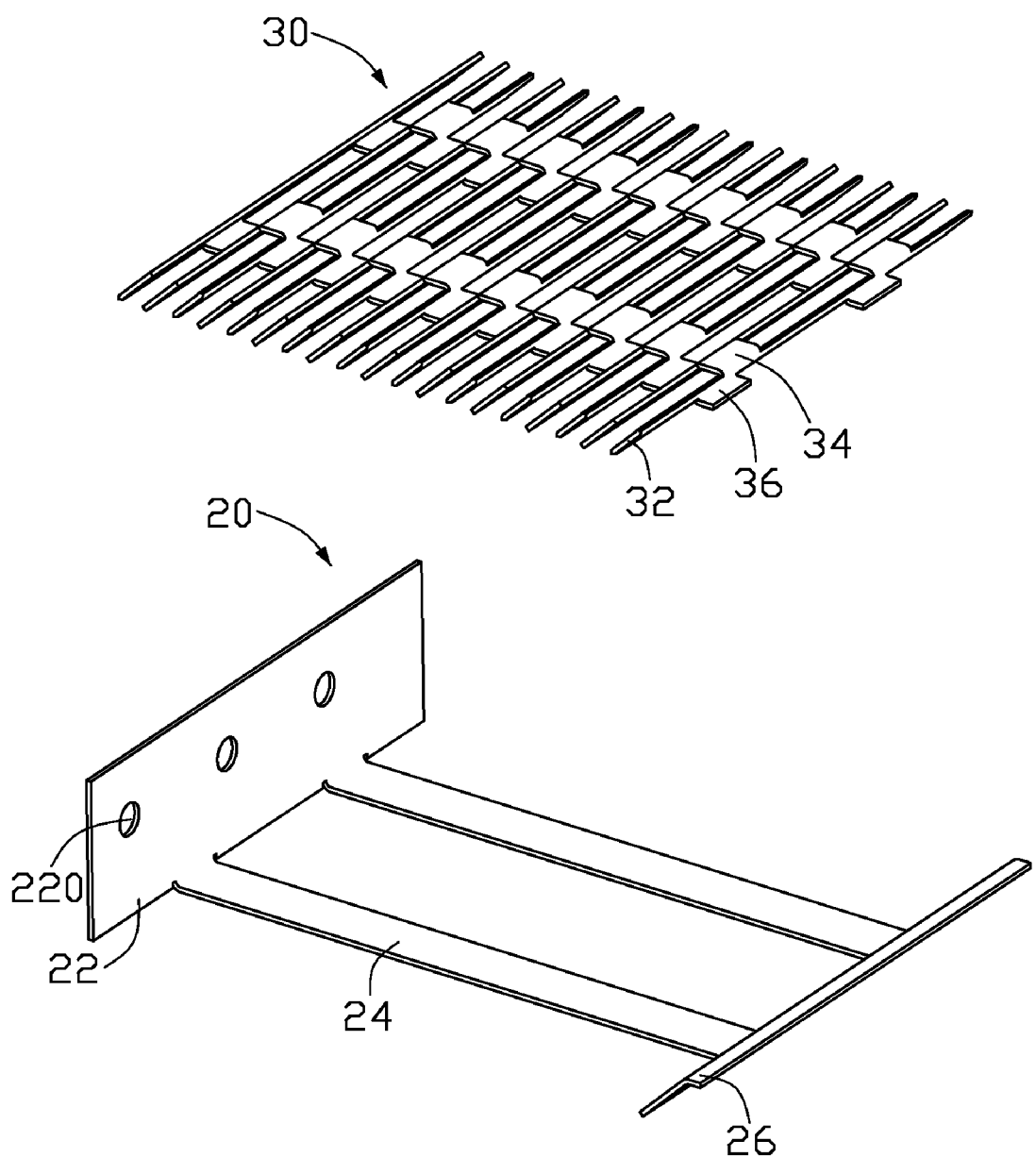
FIG. 2 is an exploded view of FIG. 1.

As shown in FIG. 2, the bracket 20 is for being attached to the projector defining the vent, thereby securing the blind 10 to the projector. The bracket 20 comprises a mounting plate 22, a pair of elongated strips 24 extending perpendicularly from a side of the mounting plate 22, and a flange 26 formed slantwise and upwardly from distal ends of the pair of strips 24. The mounting plate 22 has a substantially rectangular configuration with three through holes 220 defined therein for extension of three screws (not shown) therethrough, to threadedly engage in the projector to thereby secure the bracket 20 to the projector. The three through holes 220 are equidistantly spaced, and arranged in a common line that is parallel to a long, bottom edge of the mounting plate 20. The pair of strips 24 extend horizontally from the long, bottom edge of the mounting plate 20 and are coplanar with each other. The flange 26 is so configured that it comprises a rectangular portion (not labeled) having a bottom side connecting the distal ends of the pair of strips 24 with an angle of 135° defined therebetween. An elongated portion (not labeled) is bent horizontally from a top side of the rectangular portion.

The fin arrangement 30 is made integrally as a signal piece and its surface is anodized and blackened for absorbing light as much as possible. The fin arrangement 30 preferably is formed by stamping and folding a metal sheet, for example an aluminum sheet, into a folded fin. The fin arrangement 30 comprises a plurality of fins 32 spaced from each other with predetermined distances, and a plurality of tabs 34, 36 interconnecting the fins 32. Each of the fins 32 is oriented parallel to the rectangular portion of the flange 26 of the bracket 20 so as to define an angle of 135° with the pair of strips 24. Distances between adjacent fins 32 are equal to each other. Thus, the fins 32 cooperatively define a plurality of evenly distributed gaps (not labeled) therebetween for allowing the heated airflow to flow from an inside of the project through the blind 10 to a surrounding environment. The tabs 34, 36 are essentially identical to each other, and divided as a plurality of groups each lying at two sides (i.e., right side and left side) of each of the fins 32 respectively. Furthermore, the tabs 34, 36 are located generally corresponding to the pair of strips 24. Each of the tab groups comprises a plurality of upper tabs 34 each interconnecting top sides of a corresponding fin 32 and an adjacent fin 32, and a plurality of lower tabs 36 each interconnecting bottom sides of the corresponding fin 32 and another adjacent fin 32. The upper tabs 34 are coplanar with each other and parallel to the lower tabs 36 which are located in a common plane parallel to the pair of strips 24.

Figure 3:
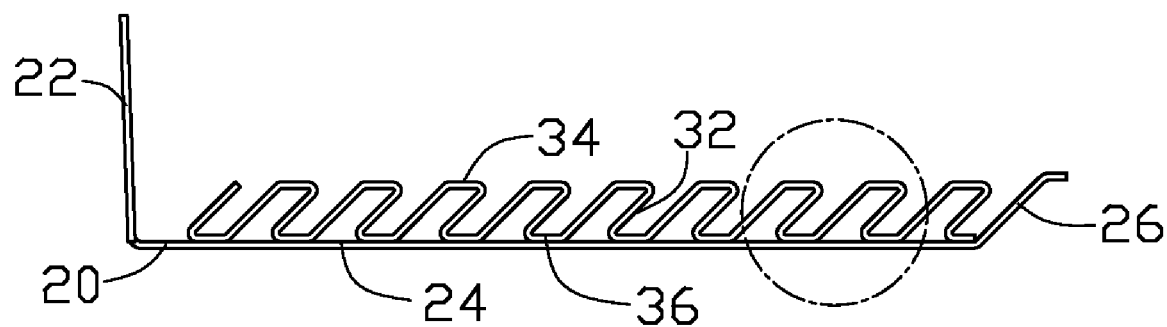
FIG. 3 is a side view of FIG. 1.
Figure 4:
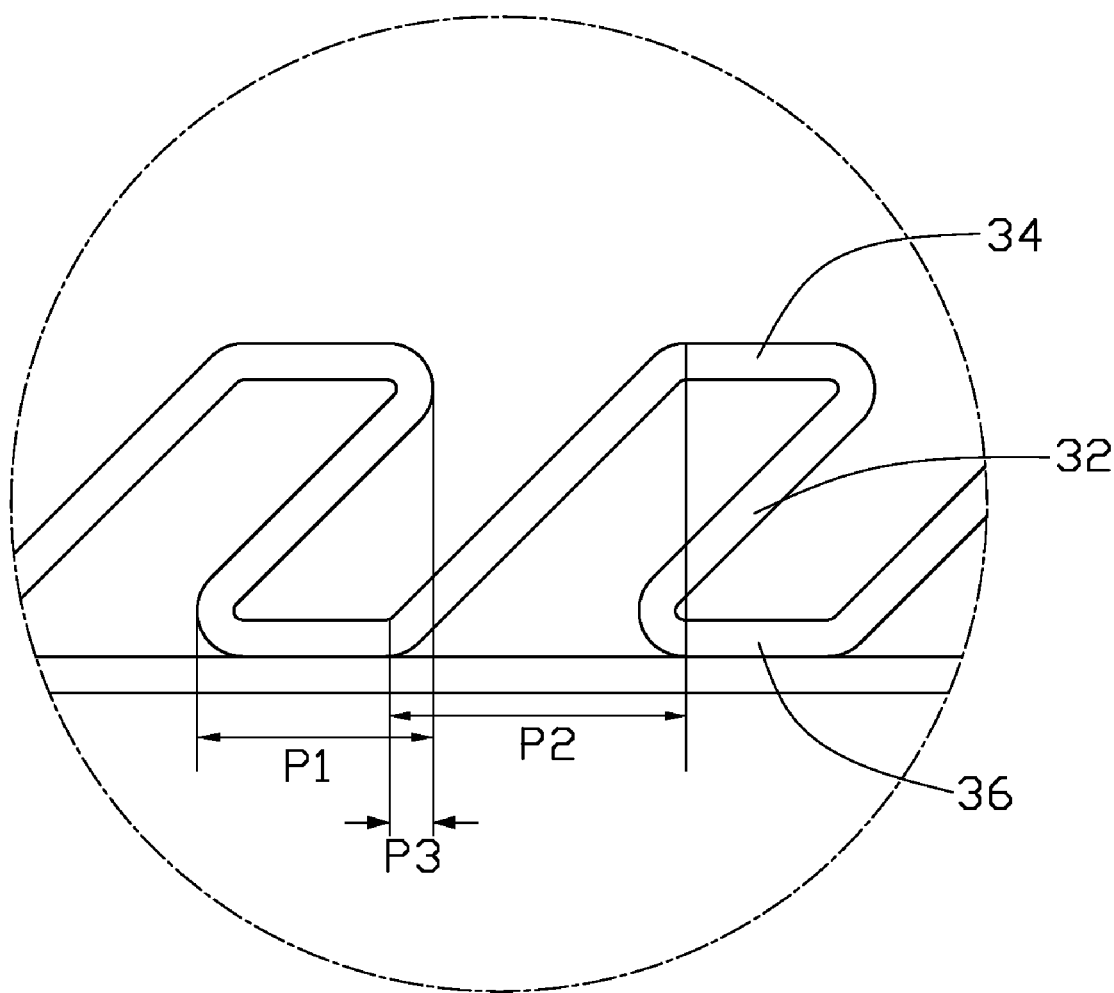
FIG. 4 is an enlarged view of a circled part of the blind of FIG. 3.

Referring to FIGS. 3-4, a horizontal projection (P1) of each of the fins 32 on the plane defined by the lower tabs 36 has a superposing area (P3) with a horizontal projection (P2) of an adjacent fin 32 on the plane defined by the lower tabs 36, wherein a width of the superposing area (P3) can be dimensioned as 0.5 mm in the preferred embodiment of the present invention for preventing the light from leaking from the gaps between adjacent fins 32, when the light projects vertically with respective to the plane defined by the lower tabs 36. The fin arrangement 30 is fixed to the bracket 20 firmly by soldering the lower tabs 36 to the pair of strips 24.

In use, when the light of the project reaches the blind 10, a major part of the light is absorbed by the fins 32. A small part of the light is reflected from the fins 32, which returns to the inside of the project or is directed to and absorbed by overlapped parts of adjacent fins 32. The gaps between the fins 32 can provide passages for expelling the heated air which has passed through a light source in the interior of the projector out of the projector, thereby removing the heat from the projector. The blind 10 not only avoids the light leakage of the projector, but also communicates the interior with the exterior of the projector for dissipating heat from the projector.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A blind for covering a heat air exhaust of a projector, comprising:
    a bracket adapted for being mounted to the projector; and
    a fin arrangement mounted on the bracket, adapted for covering the heat air exhaust, and comprising:
        a plurality of spaced and inclined fins; and
        a plurality of tabs interconnecting the fins, the tabs being attached to the bracket to secure the fin arrangement on the bracket, the fins being adapted for preventing a light leakage of the projector, while enabling an airflow to flow therethrough to leave the projector, wherein a projection of one of the fins on a plane defined by the tabs overlaps a part of an adjacent one of the fins, and wherein the fin arrangement is anodized and blackened.

2. The blind as claimed in claim 1, wherein the fins are parallel to each other, each of the fins defining an angle of 135° relative to the tabs.

3. The blind as claimed in claim 1, wherein the tabs are divided into a plurality of tab groups each being located at two lateral sides of each of the fins.

4. The blind as claimed in claim 3, wherein each of the tab groups comprises a plurality of upper tabs and a plurality of lower tabs.

5. The blind as claimed in claim 4, wherein the each of the upper tabs interconnects top portions of a fin and an adjacent fin, and the each of the lower tabs interconnects bottom portions of the fin and another adjacent fin.

6. The blind as claimed in claim 4, wherein the bracket comprises a mounting plate adapted for being fixed to the projector, a pair of strips extending perpendicularly from a side of the mounting plate, and a flange formed slantwise from distal ends of the pair of strips.

7. The blind as claimed in claim 6, wherein the lower tabs of the fin arrangement are fixed on the pair of strips of the bracket for attaching the fin arrangement to the bracket.

8. The blind as claimed in claim 7, wherein the flange has a first portion connecting the pair of strips, and a second portion bent horizontally from the first portion, the first portion being parallel to the fins and the second portion being parallel to the tabs of the fin arrangement.

9. A folded fin for covering a heated air exhaust of a projector, comprising:
    a plurality of parallel fins spaced from each other;
    a plurality of first tabs extending from top portions of the fins to interconnect the top portions of the fins; and
    a plurality of second tabs extending from bottom portions of the fins to interconnect the bottom portions of the fins, wherein the second tabs are horizontally extended and the plurality of the fins are inclinedly connected to the second tabs, a projection of one of the fins on a horizontal plane overlapping a neighboring one of the fins.

10. The folded fin as claimed in claim 9, wherein the fins are inclined relative to the second tabs at an angle of 135 degrees.

11. The folded fin as claimed in claim 10, wherein the first tabs are in line with each other, and the second tabs are in line with each other.

12. The folded fin as claimed in claim 11, wherein the folded fin is made integrally as a single piece.

13. A blind for covering a hot air exhaust of a projector, comprising:
    a bracket adapted to be attached to the projector, comprising at least a horizontally extended strip; and
    a fin arrangement secured to the bracket and adapted for covering the hot air exhaust, the fin arrangement blocking light of the projector from leakage via the hot air exhaust while allowing heated air generated by the projector to be exhausted from the projector via the hot air exhaust;
    wherein the fin arrangement includes a plurality of fins spaced from each other and inclinedly attached to the at least a strip of the bracket, a horizontal projection of each of the fins overlapping a neighboring one of the fins.

14. The blind as claimed in claim 13, wherein the fins are inclinedly attached to the at least a strip with an angle of 135 degrees between the fins and the at least a strip.

* * * * *